(12) United States Patent
Tran et al.

(10) Patent No.: US 7,472,486 B2
(45) Date of Patent: Jan. 6, 2009

(54) LEVEL WITH VIAL AND MANUFACTURING METHOD THEREFOR

(75) Inventors: Tho Tran, West Hartford, CT (US); John C. Murray, Canton, CT (US)

(73) Assignee: The Stanley Works, New Britain, CT (US)

(*) Notice: Subject to any disclaimer, the term of this patent is extended or adjusted under 35 U.S.C. 154(b) by 0 days.

(21) Appl. No.: 11/436,539

(22) Filed: May 19, 2006

(65) Prior Publication Data
US 2007/0266578 A1    Nov. 22, 2007

(51) Int. Cl.
*G01C 9/28*    (2006.01)

(52) U.S. Cl. .................................................. 33/379

(58) Field of Classification Search ............... 33/379, 33/365, 369, 389, 366, 451, 390
See application file for complete search history.

(56) References Cited

U.S. PATENT DOCUMENTS

| | | | |
|---|---|---|---|
| 356,645 A | 1/1887 | Jasper | |
| 1,488,419 A | 3/1924 | Ward | |
| 2,502,171 A | 3/1950 | Pashby | 33/207 |
| 2,536,788 A | 1/1951 | Vaida | 33/211 |
| 2,576,202 A | 11/1951 | Wullschleger | 33/211 |
| 2,611,972 A | 9/1952 | Gubrud | 33/211 |
| 2,634,509 A | 4/1953 | Roberts | 33/211 |
| 2,639,514 A | 5/1953 | Garrison | 33/211 |
| 2,679,698 A | 6/1954 | Roberts | 33/211 |
| 2,750,676 A | 6/1956 | Beam et al. | 33/179.5 |
| 2,752,693 A | 7/1956 | Wullschleger | 33/211 |
| 3,009,250 A | 11/1961 | Schock | 33/89 |
| 3,180,035 A | 4/1965 | Olexson et al. | 33/207 |
| 3,298,106 A | 1/1967 | Duvall | 33/185 |
| 3,339,609 A | 9/1967 | Cushman | 151/41.7 |
| 3,442,024 A | 5/1969 | Don | 33/211 |
| 3,593,428 A | 7/1971 | Jacoff | 33/211 |
| 3,747,221 A | 7/1973 | Ostrager | 33/371 |
| 3,824,700 A * | 7/1974 | Rutty | 33/379 |
| 3,842,514 A * | 10/1974 | Scheyer | 33/379 |
| 3,871,109 A | 3/1975 | Vaida | 33/379 |
| 3,871,110 A | 3/1975 | Gutowski et al. | 33/379 |
| 3,917,779 A | 11/1975 | Breer et al. | 264/46.5 |
| 4,100,681 A | 7/1978 | Hollander | 33/389 |
| 4,124,940 A * | 11/1978 | Vaida | 33/379 |

(Continued)

FOREIGN PATENT DOCUMENTS

DE    3 215 667 A1    10/1983

(Continued)

*Primary Examiner*—G. Bradley Bennett
(74) *Attorney, Agent, or Firm*—Pillsbury Winthrop Shaw Pittman LLP

(57) ABSTRACT

A level with a level indicating vial is disclosed. The level includes a frame that defines at least one substantially flat exterior surface configured to be placed against a reference surface. The frame defines a plurality of interior surfaces. The level also includes a vial for indicating an orientation of the reference surface, and a vial holder for holding the vial in an orientation relative to the flat exterior surface of the frame. The vial holder is configured to cooperate with one of the interior surfaces of the frame to define a cavity when the vial holder contacts the interior surface. The level also includes an adhesive disposed in the cavity to secure the vial holder to the frame.

30 Claims, 12 Drawing Sheets

U.S. PATENT DOCUMENTS

| | | | | |
|---|---|---|---|---|
| 4,224,971 A | 9/1980 | Müller et al. | ............... | 151/41.7 |
| 4,347,088 A | 8/1982 | Jacquet | ................. | 156/69 |
| 4,407,075 A * | 10/1983 | MacDermott et al. | ...... | 33/348.2 |
| 4,492,038 A * | 1/1985 | Mayes | ................. | 33/379 |
| 4,503,624 A | 3/1985 | Whiteford | ............... | 33/451 |
| 4,521,974 A * | 6/1985 | Neis et al. | ................. | 33/379 |
| 4,534,117 A | 8/1985 | Haefner et al. | ............... | 33/379 |
| 4,635,377 A | 1/1987 | Park | ................. | 33/451 |
| 4,660,290 A | 4/1987 | Hori et al. | ................. | 33/366 |
| 4,685,219 A | 8/1987 | Haefner et al. | ............... | 33/379 |
| 4,697,349 A | 10/1987 | Lee | ................. | 33/27.03 |
| 4,860,459 A | 8/1989 | Dengler | ................. | 33/379 |
| 5,003,699 A | 4/1991 | Wright | ................. | 33/379 |
| 5,151,849 A | 9/1992 | Nagengast et al. | ............ | 362/61 |
| 5,157,842 A | 10/1992 | Swanda | ................. | 33/365 |
| 5,406,714 A | 4/1995 | Baker et al. | ................. | 33/382 |
| 5,438,761 A | 8/1995 | Krumszyn et al. | ............ | 33/451 |
| 5,459,934 A | 10/1995 | Heroux | ................. | 33/373 |
| 5,467,532 A | 11/1995 | Ames | ................. | 33/334 |
| 5,604,987 A | 2/1997 | Cupp | ................. | 33/275 |
| 5,670,109 A | 9/1997 | DeRees | ................. | 264/261 |
| 5,685,577 A | 11/1997 | Vanesky | ................. | 285/294 |
| 5,709,034 A | 1/1998 | Kohner | ................. | 33/377 |
| 5,778,544 A | 7/1998 | Pherigo | ................. | 33/335 |
| 5,887,783 A | 3/1999 | Prokopis | ................. | 229/199 |
| 5,966,826 A | 10/1999 | Ho | ................. | 33/365 |
| 5,992,033 A | 11/1999 | Scarborough | ................. | 33/384 |
| 6,059,483 A | 5/2000 | Owens et al. | ............... | 403/267 |
| 6,148,530 A | 11/2000 | Jacoff et al. | ................. | 33/377 |
| 6,415,121 B1 | 7/2002 | Suzuki et al. | ............... | 399/111 |
| 6,430,827 B2 | 8/2002 | Ruther | ................. | 33/451 |
| 6,568,095 B2 | 5/2003 | Snyder | ................. | 33/370 |
| 6,572,073 B2 | 6/2003 | Jacoff | ................. | 249/67 |
| 6,613,261 B2 | 9/2003 | Knapp | ................. | 264/250 |
| 6,675,490 B1 | 1/2004 | Krehel et al. | ................. | 33/382 |
| 6,735,880 B1 | 5/2004 | Jacoff | ................. | 33/379 |
| 6,792,686 B2 | 9/2004 | Krehel et al. | ................. | 33/382 |
| 6,851,200 B2 | 2/2005 | Tan et al. | ................. | 33/348.2 |
| 2002/0037179 A1 | 3/2002 | Suzuki et al. | ............... | 399/111 |
| 2003/0005590 A1 | 1/2003 | Snyder | ................. | 33/370 |
| 2003/0102668 A1 | 6/2003 | Tarbutton et al. | ........... | 285/328 |
| 2003/0140511 A1 | 7/2003 | Obergoenner | ................. | 33/379 |
| 2004/0025360 A1 | 2/2004 | Obergoenner | ................. | 33/382 |
| 2004/0143981 A1 | 7/2004 | Krehel et al. | ................. | 33/382 |
| 2005/0003161 A1 | 1/2005 | Abe et al. | ................. | 428/162 |
| 2005/0155241 A1 | 7/2005 | Scheyer | ................. | 33/379 |
| 2005/0160610 A1 | 7/2005 | Scheyer | ................. | 33/379 |
| 2005/0181173 A1 | 8/2005 | Hermann | ................. | 428/119 |

FOREIGN PATENT DOCUMENTS

| | | |
|---|---|---|
| DE | 3 432 911 A1 | 3/1986 |
| DE | 3 805 989 | 9/1989 |
| EP | 0 070 476 B1 | 4/1985 |
| EP | 0 238 897 B1 | 5/1990 |
| FR | 2247704 | 5/1975 |
| GB | 2 222 677 A | 3/1990 |

* cited by examiner

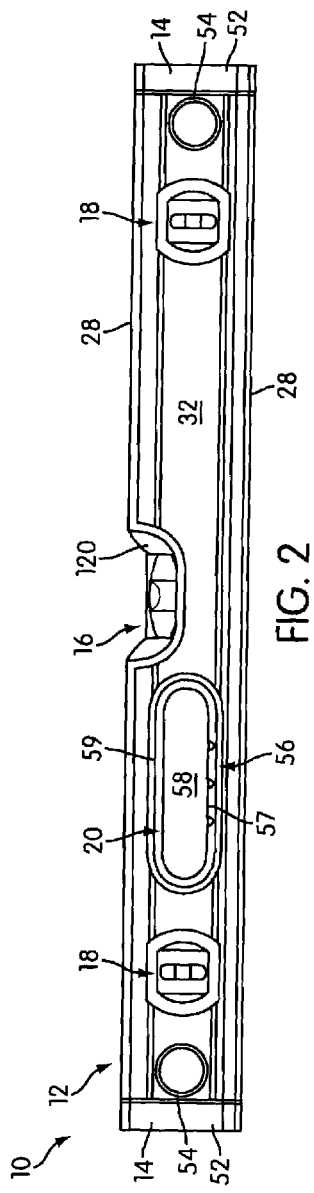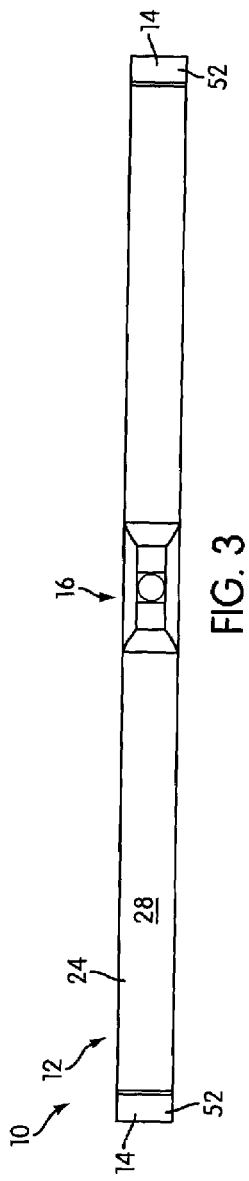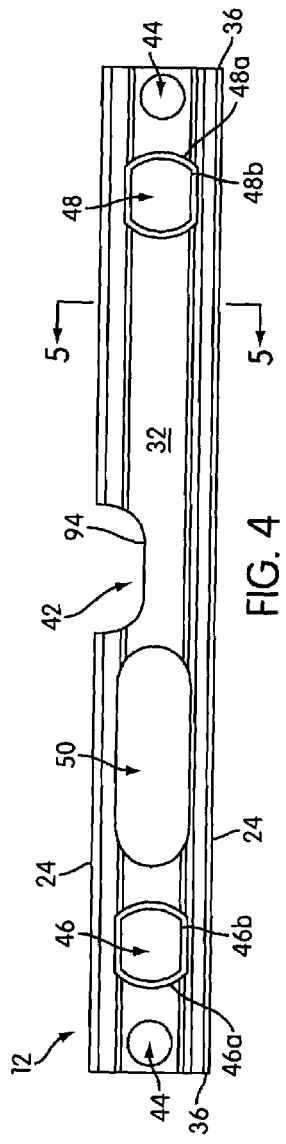

LEVEL WITH VIAL AND MANUFACTURING METHOD THEREFOR

BACKGROUND OF THE INVENTION

1. Field of Invention

The present invention is generally related to levels that include level vials and the manufacturing of such levels.

2. Description of Related Art

Level vials have been mounted to level frames, either directly or via a vial holder, by a variety of techniques. Fasteners, such as screws, have been used to attach vial holders carrying the level vials to wooden or metal frames. It is also common to attach level vials and their holders to the level frames with adhesives.

During a typical assembly of a level, the level vial is adjusted in its holder while the level is positioned on a known level surface. When the level vial has been adjusted to the correct position, as indicated by the bubble contained therein, the level vial is glued in place. The vial holder may also be glued in place. The order in which the attachment occurs may vary. For example, the level vial may be attached to the vial holder first, then the vial holder may be adjusted and attached to the level frame, or the vial holder may be attached to the frame first, then the level vial may be attached to the vial holder. The amount of adhesive that may be used to glue the vial holder in place in the frame may vary greatly. Nothing prevents an excess amount of adhesive from being applied, and upon application, the adhesive may freely flow within the frame. However, if too little adhesive is applied, there is a risk that the adhesive bond between the vial holder and the frame may fail over time. Therefore, to err on the side of caution, excess adhesive is typically applied, which creates an additional cost to manufacture the level.

In addition, typical levels also include plumb and/or 45° vial stations that are located near the ends of the level. Levels that have frames of a hollow construction have the plumb vial stations located near the ends of the level, because during assembly, the plumb vial stations are inserted into the frame through the openings at each the end of the frame.

It is desirable decrease the cost to manufacture levels, yet still provide a durable, highly accurate level, both with horizontal and vertical (plumb) vials.

BRIEF SUMMARY OF THE INVENTION

One aspect of the present invention is to provide a durable and accurate level without wasting material during its assembly, and a method for assembling such a level.

In an embodiment of the invention, a level is provided. The level includes a frame that defines at least one substantially flat exterior surface configured to be placed against a reference surface. The frame defines a plurality of interior surfaces. The level also includes a vial for indicating an orientation of the reference surface, and a vial holder for holding the vial in an orientation relative to the flat exterior surface of the frame. The vial holder is configured to cooperate with one of the interior surfaces of the frame to define a cavity when the vial holder contacts the interior surface. The level also includes an adhesive disposed in the cavity to secure the vial holder to the frame.

In an embodiment, a method for assembling a level is provided. The level includes a frame, a vial holder, and a vial. The method includes inserting the vial holder into the frame, providing a predetermined amount of adhesive to a cavity formed between the vial holder and the frame to adhere the vial holder to the frame, and securing the vial to the vial holder. In an embodiment, a level is provided. The level includes a frame that defines at least one flat exterior surface to be placed against a reference surface. The frame includes a first side wall and a second side wall. The first and second side walls are generally parallel to one another. The level also includes a vial for indicating an orientation of the reference surface, and a vial holder for holding the vial in an orientation relative to the flat exterior surface of the frame. The first side wall has a first opening and the second side wall has a second opening. The first opening and the second opening are generally aligned, and the first opening in the first side wall is of a larger dimension than the second opening in the second side wall. The vial holder has a first portion defining a first peripheral window through which the vial can be viewed, and a second portion connected to the first portion. The second portion defines a second peripheral window through which the vial can be viewed. The second portion is insertable through the first opening to engage an interior surface of the second side wall and such that the second peripheral window is positioned adjacent to the second opening in the second side wall. The first portion is insertable into the first opening so that the first peripheral window is positioned adjacent to the first opening in the first side wall.

In an embodiment, a method of manufacturing a level is provided. The method includes forming a frame. The frame includes at least one flat exterior surface to be placed against a reference surface and a pair of generally parallel first and second side walls. The first side wall has a first opening, and the second side wall has a second opening. The first and second openings are generally aligned, with the first opening being of a larger dimension than the second opening. The method also includes providing a vial holder for holding a vial. The vial holder has a first portion and a second portion. The method further includes inserting the second portion of the vial holder through the larger dimensioned first opening such that a portion of the second portion engages an interior surface of the second wall, adjacent the second opening, and such that a peripheral window of the second portion through which the vial can be viewed is disposed adjacent to the second opening. The method also includes inserting the first portion of the vial holder into the larger dimensioned first opening such that a peripheral window of the first portion through which the vial can be viewed is disposed adjacent to the first opening.

In an embodiment, a level is provided. The level includes a frame that defines at least one flat exterior surface to be placed against a reference surface. The frame includes a first side wall and a second side wall. The first and second side walls are generally parallel to one another. The first side wall has a first opening, and the second side wall has a second opening generally aligned with the first opening. The level also includes a vial for indicating an orientation of the reference surface, and a vial holder for holding the vial in an orientation relative to the flat exterior surface. The vial holder has a first peripheral window disposed adjacent to the first opening, and a second peripheral window disposed adjacent to the second opening. The first peripheral window has a peripheral surface that is generally flush with an exterior surface of the first side wall, and the second peripheral window has a peripheral surface that is generally flush with an exterior surface of the second side wall.

Other aspects, features, and advantages of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 2 is a side view of the level of FIG. 1;

FIG. 3 is a top view of the level of FIG. 1;

FIG. 4 is a side view of a frame of the level of FIG. 2;

DETAILED DESCRIPTION OF THE INVENTION

Figure 1:
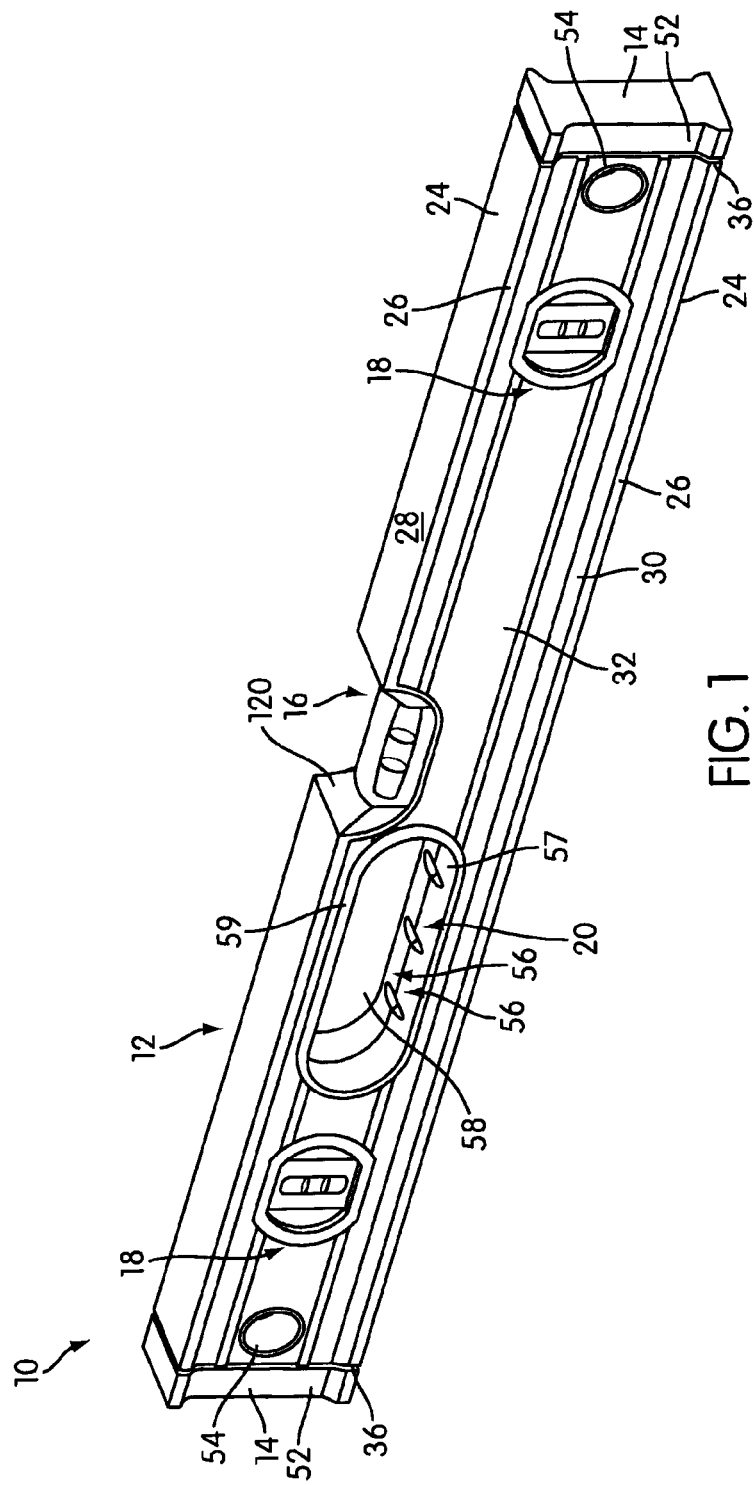
FIG. 1 is a perspective view of a fully assembled level according to an embodiment of the invention.

Referring now more particularly to the drawings, FIG. 1 shows an embodiment of a level, generally indicated at 10, embodying the principles of the present invention. The level 10 comprises a frame, generally indicated at 12, having an extruded thin wall structure with an opening of I-shaped configuration from end to end thereof. A pair of end members, generally indicated at 14, is mounted in the open ends of the frame 12. Each end member 14 is constructed and arranged to cooperate with the configuration of the frame 12 so as to be fixedly secured in closing relation with respect to the associated end of the frame 12.

The level 10 further comprises a horizontal level indicating vial assembly, generally indicated at 16, a pair of vertical level indicating vial assemblies, generally indicated at 18, and a hand hold assembly, generally indicated at 20. The horizontal level indicating vial assembly 16, the pair of vertical level indicating vial assemblies 18, and the hand hold assembly 20 are constructed and arranged to cooperate with the configuration of the frame 12 so as to be fixedly secured within the frame 12, as will be discussed in further detail below.

Figure 5:
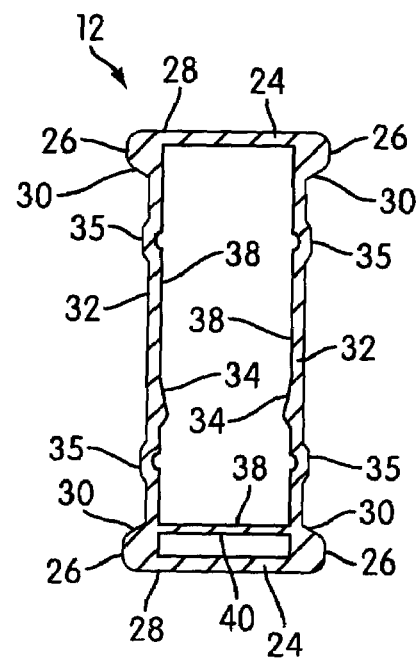
FIG. 5 is a cross-sectional view of the frame taken along line 5-5 in FIG. 4.

As best shown in FIG. 5, the frame 12 includes a pair of elongated operative walls 24. Each operative wall 24 has a pair of transversely spaced inwardly turned flanges 26 defining the width thereof and an exterior operative surface 28 on each of the operative walls 24 extending between the flanges 26 thereof. The operative surfaces 28 are preferably planar and parallel and are configured to come into contact with a reference surface, but may take other configurations to provide enhanced resistance to twisting loads about the longitudinal axis of the frame 12. A pair of angular walls 30 extends from each pair of spaced flanges 26 in converging relation with one another to provide structural continuity for the frame 12.

A pair of central side walls 32 are spaced apart in the direction of the width of the operative walls 24 a distance less than the width of the operative walls 24 and integrally interconnected between the pairs of angular walls 30 extending from the flanges 26. A pair of inwardly defined ribs 34 may extend inwardly from one of the central side walls 32 and toward the opposite central side wall 32. As discussed in greater detail below, the inwardly defined ribs 34 may be used to help position and attach the horizontal level indicating vial assembly 16, and the vertical level indicating vial assemblies 18 to the frame 12. The frame 12 may also include opposing pairs of outwardly defined ribs 35 that extend outwardly from the central side walls 32, as shown in FIG. 5. These outwardly defined ribs 35 may help provide strength to the frame 12 by providing enhanced resistance to twisting loads about the longitudinal axis of the frame 12. A plurality of interior surfaces 38 of the frame 12 are defined by the elongated operative walls 24, the central side walls 32, as well as an elongated reinforcing rib 40 that is parallel to the pair of elongated operative walls 24, as shown in FIG. 5. The elongated reinforcing rib 40 extends the entire length of the frame 12 and not only provides reinforcement to the frame 12, but also provides the interior surface 38 on which the horizontal indicating level vial assembly 16 may be mounted, as discussed in further detail below.

The frame 12 is preferably made from aluminum as for example, 6005 T5 aluminum. It is contemplated that the frame 12 could be made from any suitable material for securing the pair of end members 14, the horizontal level indicating assembly 16, the pairs of vertical indicating assemblies 18, and the hand hold assembly 20 therein.

As shown in FIG. 4, one of the operative walls 24 of the frame 12 has a central opening 42 therein. The opening 42 extends into the pair of central side walls 32 so as to define a space for the horizontal level indicating vial assembly 16, as will be discussed in further detail below. The pair of central side walls 32 further includes a plurality of adjacent coextensive generally aligned openings 46, 48, 50 therethrough. There are two pairs of aligned openings 46, 48 that are each configured to receive one of the vertical level assemblies 18.

The aligned openings 46 include a larger opening 46a in one of the central side walls 32, and a smaller opening 46b in the opposite central side wall 32. Similarly, the aligned openings 48 include a larger opening 48a in one of the central side walls 32, and a smaller opening 48b in the opposite central side wall 32. The purpose for the different sized openings will be discussed in greater detail below.

The openings 50 are longitudinally elongated and may have a plurality of recesses (not shown) in the periphery thereof configured to receive the hand hold assembly 20. In addition to the insert receiving openings 42, 46, 48 and 50, there are also a pair of openings 44 near each end of the frame 12. The edges 36 and the openings 44 at each end of the frame 12 cooperate with the associated end member 14 to retain it in a fixed position relative to the frame 12. The remaining portions of the operative wall 24 coextensive with the central opening 42 and the associated coextensive portions of the adjacent flanges 26 and angular walls 28 provide structural continuity for the frame 12 in the area of the openings 46, 48, and 50.

Each end member 14 is formed in an inner core of relatively hard material, which interfaces with the frame 12 and an outer layer of elastomeric material. The relatively hard material may be a commercially available material from the Taiwan Polypropylene Company and sold under the name Profax 7533. The elastomeric material may be a thermoplastic elastomer having a durometer ranging from 70-80 as for example, J Flex 3210-63A. As best shown in FIGS. 1, and 2, each end member 14 includes an end portion 52 extending outwardly of the adjacent end edge 36 of the frame 12. The elastomeric material provides a shock absorption function for the associated end of the frame 12 in the event that the level 10 is dropped on an end.

A projecting portion (not shown) extends from each end portion 52 and is received within the frame 12. Interior interference surfaces also formed by the harder core material extend inwardly from the inwardly extending end edges in slightly converging relation toward one another. The interior interference surfaces of each end member 14 are disposed adjacent the interior frame surfaces of the associated operative wall 24 throughout the width thereof. Rivets 54, or any other suitable connectors, are used to secure the end members 14 to the frame 12. Specifically, for each end member 14, one rivet 54 is passed through one of the openings 44 in one of the central side walls 32, then through the projecting portion of the end member 14, then through the other aligned opening 44 in the opposite central side wall 32. This helps to prevent the end member 14 from being separated from the frame 12, even when the level 10 is dropped on a hard surface.

FIGS. 1 and 2 illustrate the hand hold assembly 20, which includes a pair of longitudinally elongated cooperating peripheral members 56. The cooperating peripheral members 56 are formed of identical configuration. The cooperating peripheral members 56 are formed in a mold to include an inner core of relatively hard material as for example polypropylene, which interfaces with the frame 12 and an outer layer of elastomeric material, which defines a hand hold opening 58 in the position of the elongated openings 50 in the central side walls 32.

The outer layer of each peripheral member 56 forms one half of the hand hold opening 58, the dual material construction of which is essentially an elongated annular wall 57 having an outwardly extending peripheral flange portion 59 providing a surface at one end thereof configured and positioned to engage an exterior marginal surface area of the central side wall 32 surrounding the elongated openings 50 therein. The inner ends of the outer layer of the annular walls 57 abut one another at the centerline.

The hand hold assembly 20 is moved into the operative position thereof in the following manner. The cooperating peripheral members 56 are axially moved into the operative position thereof to retain the peripheral members 56 in fixed relation. The peripheral members 56 are configured to provide a snug fit with the openings 50. The surface of the outwardly extending flange portion 59 engages the outwardly facing exterior marginal surface area of the central side walls 32 surrounding the elongated openings 50. One peripheral member 56 abuts the annular wall 57 of the other peripheral member 56 to define the hand hold opening 58 in the position of the elongated openings 50 in the central side walls 32.

The peripheral members 56 may be attached to one another with adhesive, screws or any other type of fastener. In an embodiment, screws are inserted through one of the peripheral members 56 and into the other peripheral member 56, thereby securing the two peripheral members to each other, with the thin wall frame structure 12 disposed therebetween. Further details of the hand hold assembly 20 may be found in, for example, U.S. Pat. No. 6,792,686, which is incorporated herein by reference.

As shown in FIGS. 6-11, the horizontal level indicating vial assembly 16 includes a horizontal level indicating vial 60, a vial mount 62, a vial holder 64, and a plug 66 or cover.

Figure 6:
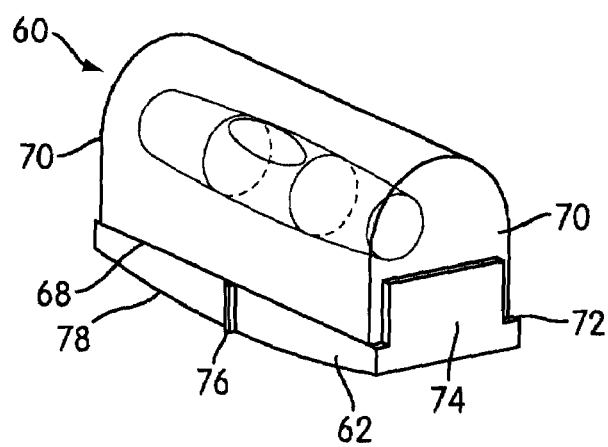
FIG. 6 is a perspective view of an embodiment of a horizontal indicating vial and mounting plate of a horizontal indicating level vial assembly.

In an embodiment, the vial 60 of the type that is commercially available and made of clear acrylic. As illustrated in FIG. 6, the vial 60 is rounded on three sides thereof so as to give a magnified effect when viewed from any position. The vial 60 also includes an elongated substantially horizontal planar surface 68 and a pair of substantially parallel vertical surfaces 70 that extend from the elongated horizontal surface 68 in a substantially perpendicular manner. The vertical surfaces 70 define the ends of the vial 60. It is contemplated that any type of horizontal level indicating vial that is capable of providing accurate horizontal level indications may be used, and the illustrated embodiment should not be considered to be limiting in any way.

The vial mount 62 is constructed and arranged to fixedly secure the vial 60 in an operative position to the vial holder 64. As shown in FIG. 6, the vial mount 62 includes a substantially horizontal planar surface 72 that is configured to receive the horizontal planar surface 68 of the vial 60. The vial mount 62 also includes a pair of substantially vertical planar walls 74 at each end that are configured to contact the vertical surfaces 70 of the vial 60. The vial 60 may be secured to the vial mount 62 with any suitable adhesive. As illustrated, the vial mount 62 also includes a guide 76 or indicator that is preferably at the center of the vial mount 62 so as to correspond with the center of the vial 60 when the vial 60 is mounted to the vial mount 62. The guide 76 may be in the form of a protrusion or groove, or may be a printed mark. A bottom surface 78 of the vial mount 62 may be curved, as shown in FIG. 6, which may help facilitate the leveling of the vial 60 to its proper position upon assembly of the level 10.

Figure 8:
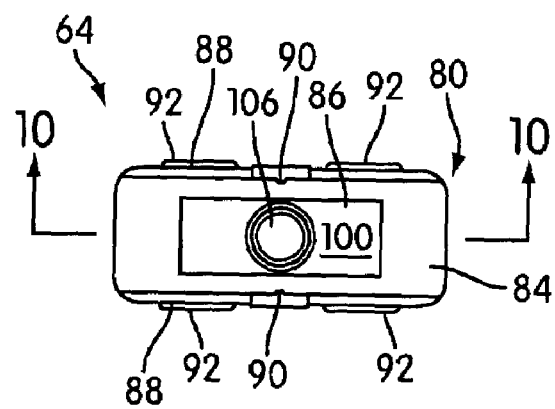
FIG. 8 is a top view of the vial holder of FIG. 7.
Figure 9:
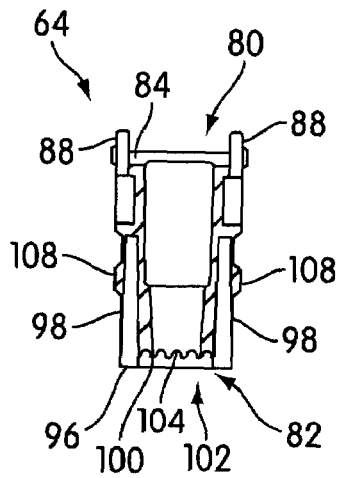
FIG. 9 is a cross-sectional view of the vial holder taken along line 9-9 in FIG. 7.
Figure 10:
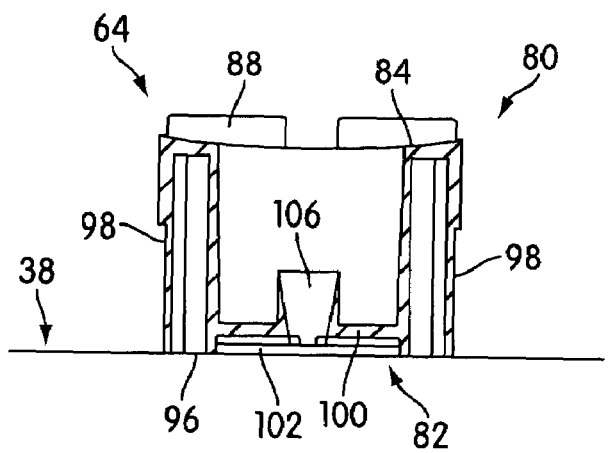
FIG. 10 is a cross-sectional view of the vial holder taken along line 10-10 in FIG. 8.

FIGS. 7-10 illustrate an embodiment of the vial holder 64. The vial holder 64 may be molded from any suitable plastic material. As shown, the vial holder 64 is substantially rectangular in shape, and includes a vial mount receiving portion 80 at a top end thereof, and a frame engaging portion 82 at a bottom end thereof. The vial mount receiving portion 80 includes a surface 84 with an opening 86. The surface 84 is configured to engage the bottom surface 78 of the vial mount 62 such that the two surfaces 78, 84 engage each other along the entire surface thereof. As shown in FIG. 10, the surface 84 may also be curved. In the embodiments where both surfaces 78, 84 are curved, the surfaces 78, 84 are preferably defined by the same arc. The vial mount receiving portion 80 also includes a pair of substantially parallel opposed walls 88 that extend upward from the surface 84. The walls 88 are spaced apart such that the vial mount 62 may be snugly fit between the walls 88. Preferably, the tops of the walls 88 extend slightly above or are coplanar with the horizontal planar surface 72 of the vial mount 62 when the vial mount 62 is positioned on the surface 84 of the vial holder 64.

Figure 7:
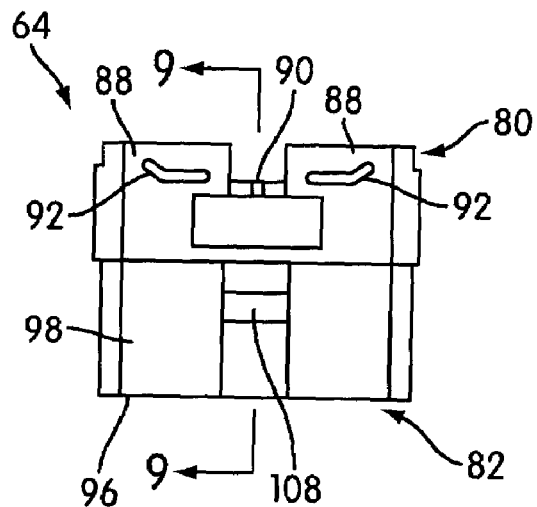
FIG. 7 is a side view of a horizontal indicating level vial holder of the horizontal indicating level vial assembly according to an embodiment of the invention.

As shown in FIGS. 7 and 8, at least one guide 90 or indicator is also provided on the vial holder 64. The guide 90 may be in the form of a protrusion or a recess, or may be a printed mark. In the illustrated embodiment, two guides 90 or indicia are provided on opposite sides of the surface 84. The guide 90 is positioned substantially in the center of the surface 84 and is configured to align with the guide 76 on the vial mount 62 to facilitate the proper mounting and aligning of the vial 60 to the frame 12. As illustrated, the vial holder 64 also includes a plurality of locators 92 that are configured to locate the vial holder 64 relative to the frame 12 in at least two directions. The locators 92 are configured to engage the central side walls 32 of the frame 12 at the opening 42. When the vial holder 64 is inserted into the frame 12 via the opening 42, the locators 92 engage upwardly facing surfaces 94 (see FIG. 4) of the walls 32 in the opening 42 so as to locate the vial holder 64 in the vertical and horizontal (along the length of the frame) directions. The shape of the locators 92 and the opening 42 are configured to locate the vial holder 64 substantially in the center of the frame 12 along its longitudinal axis. This facilitates proper placement of the vial holder 64 in the frame 12.

The frame engaging portion 82 includes a surface 96 that is configured to engage the interior surface 38 of the frame 12 that is provided by the elongated reinforcing rib 40. Preferably, the surface 96 is defined by the ends of a plurality of vertical walls 98 that encompass the vial holder 64. This way, the actual contact area between the vial holder 64 and the frame 12 may be minimized. The frame engaging portion 82 also includes a bottom wall 100 that is spaced from the surface 96 so that when the surface 96 is in contact with the interior surface 38 of the frame 12, a small cavity 102 is formed, as shown in FIG. 10. The bottom wall 100 preferably includes a roughened surface, which may be created with a plurality of ribs 104 extending downward and into the cavity 102. The purpose of the cavity 102 and the ribs 104 will be explained in further detail below. An opening 106 is provided in the bottom wall 100 that allows access to the cavity 102 once the vial holder 64 has been inserted into the frame 12.

As shown in FIGS. 7 and 9, the frame engaging portion 82 also includes at least one tab 108 on one of the vertical walls 98 that is configured to engage one of the inwardly defined ribs 34 within the frame 12. In the illustrated embodiment, a pair of tabs 108 is provided on opposite walls 98 and is configured to engage the pair of inwardly defined ribs 34 illustrated in FIG. 5. Each tab 108 is preferably configured to have a sloped surface that compliments the sloped surface of the corresponding rib 34 that it engages. Each tab 108 is preferably flexible so that it is allowed to move toward the wall 98 from which it extends as the thickest portion of the tab 108 engages the thickest portion of the corresponding rib 34, so as to allow the tab 108 to pass by the rib 34 and then snap back to its normal position. This snap action allows engagement of each tab 108 and its corresponding rib 34 and locks the vial holder 64 to the frame 12 in the vertical direction.

Once the vial holder 64 has been locked into place in the frame 12 via the tabs 108, and located via the locators 92, an adhesive applicator may be inserted into the opening 106 so that a predetermined amount of adhesive may be inserted into the cavity 102. The adhesive may be an epoxy resin, or any other type of adhesive that is commonly used to attach plastic to metal. Preferably, the adhesive is a quick-setting adhesive. As shown in FIG. 10, the opening 106 may have sloped walls so that it may receive the applicator to facilitate the accurate positioning of the applicator, so that the adhesive may only flow into the cavity 102, rather than the interior of the vial holder 64. The design of the cavity 102 and the frame engaging portion 82 does not allow the adhesive to exit the cavity 102, which prevents an excessive amount of adhesive from being applied. Specifically, the bottom surface 96 of the frame engaging portion 82 defines a peripheral skirt that engages the lower interior surface 38 of the frame 12 in a manner that generally creates a peripheral seal to prevent adhesive from leaving the cavity 102. A side portion of frame engaging portion 82 may be provided with a pin-hole, or, alternatively, the bottom surface 96 may be provided with a very small gap that does not contact the lower surface 38. Such pin-hole or small gap allows air to be displaced from cavity 102 as the cavity is being filled with adhesive. In one embodiment, the pin-hole or small gap is sufficiently small that it allows no adhesive to pass therethrough. The ribs 104 in the cavity add surface area for the adhesive to contact, thereby improving the adhesive bond that may be formed between the vial holder 62 and the frame 12. Once the predetermined amount of adhesive has been inserted into the cavity 102, the applicator may be removed.

Figure 11:
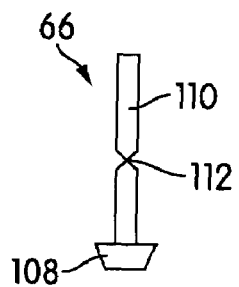
FIG. 11 is a side view of a plug of the horizontal level vial holder assembly.

To ensure that the adhesive stays within the cavity, the plug 66 or cover may be inserted into the opening. As shown in FIG. 11, one end 108 of the plug 66 may be configured to compliment the shape of the opening to provide a snug fit. Preferably, the plug 66 also contacts the adhesive, thereby attaching the plug 66 to the vial holder 64. The plug 66 includes a stem 110 with a reduced diameter portion 112 that allows the stem 110 to be broken at the reduced diameter portion 112 after the plug 66 has been securely attached to the bottom wall 100. The broken off portion of the stem may then be discarded.

After the plug 66 has been securely attached to the bottom wall 100, the vial mount 62, with the vial 60 already mounted thereon, may be attached to the vial holder 64 by aligning the guides 76, 90 and positioning the vial mount 62 so that the vial 60 is accurately positioned relative to the reference surface. That is, assuming the reference surface is exactly horizontal, the vial mount 62 is positioned so that the vial 60 gives a perfectly horizontal reading. The vial mount 62 may then be permanently attached to the vial holder 64 via a suitable adhesive. Of course, while the adhesive is still uncured, further adjustments may be made to the vial mount to ensure accuracy of the level 10. A cover 120 (shown in FIGS. 1 and 2) may be placed over the horizontal indicating vial assembly 16 to cover any openings between the assembly 16 and the frame 12 and provide a finished look.

FIGS. 1 and 2 show the pairs of vertical level indicating vial assemblies 18 in an operative position between the central side walls 32 of the frame 12. Because each of the vertical level indicating vial assemblies 18 has the same construction and operation, a description of one will suffice to provide an understanding of both.

Each vertical (plumb) indicating vial assembly 18 includes a vial holder 130, a vial 134, and a plug 132 or cover. The vial holder 130 includes a vial holder first portion 131, and a vial holder second portion 136. In general, the vial holder first portion 131 and the vial holder second portion 136 retain the vial 134 in an operative position between the central side walls 32 of the frame 12, as will be described in further detail below. In one embodiment, the vial 134 is a vertical indicating vial (plumb vial), but may also be a level vial.

Figure 14:
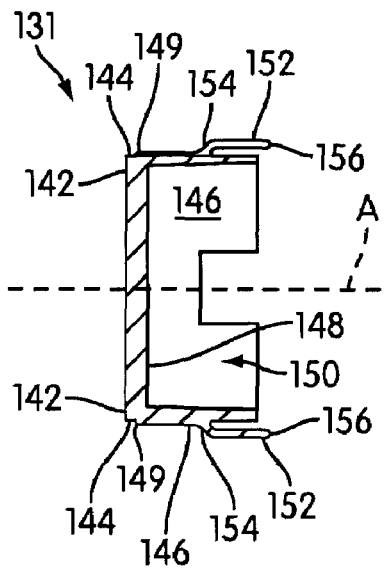
FIG. 14 is a cross-sectional view of the first portion taken along line 14-14 in FIG. 12.

FIGS. 12-16 illustrate an embodiment of a first portion of the vial holder 130. The first portion 131 of the vial holder 130 may be molded from any suitable plastic material. As shown, the first portion 131 of vial holder 130 includes a window 138 that defines an opening 140. The window 138 is configured to extend into the smaller opening 48b of the frame 12 (shown in FIG. 4) such that an outer surface 142 of the window 138 is substantially coplanar or flush with the outer surface of the central side wall 32 of the frame 12, and a circumferential (or outwardly facing) surface 144 of the window 138 engages or is adjacent to an edge of the central side wall 32 of the frame 12 created by the opening 48b (see FIG. 13). It can thus be appreciated that the length of the axially extending (relative to axis A in FIG. 14) peripheral surface 144 is approximately the same as the wall thickness of the adjacent wall 32. The window 138 is configured to complement the opening 48b such that substantially no gaps are created between the window 138 and the central side wall 32 of the frame 12 when the first portion 131 is attached to the frame 12, thereby giving the level 10 a finished look. As seen in FIG. 14, the window 138 also has a peripherally outwardly extending surface or flange 149 that engages an interior surface of the central side wall 32, adjacent the peripheral edge of the smaller opening 48b in the wall 32.

Figure 15:
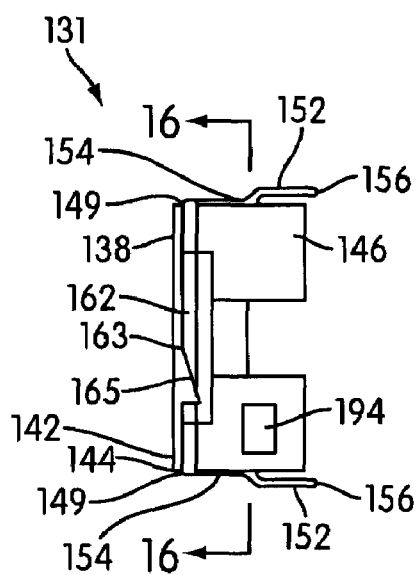
FIG. 15 is a side view of the first portion of the vial holder of FIG. 12.
Figure 15A:
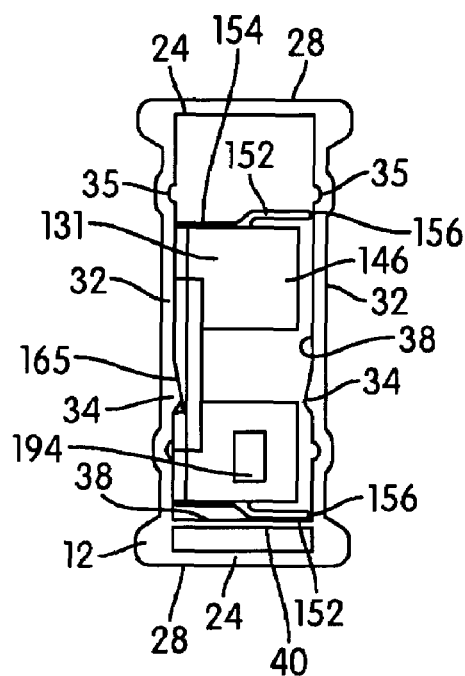
FIG. 15A is a side view of the first portion of the vial holder of FIG. 15 after it has been inserted into the frame of FIG. 4.

As shown in FIGS. 13-16, the vial holder first portion 131 also includes a wall 146 that extends from an inner surface 148 of the window 138 and defines a vial receiving space 150. Although the wall 146 may define the vial receiving space 150 to be any suitable shape that complements the vertical level indicating vial 134, the space 150 preferably has a substantially circular circumference, as defined by inner cylindrical wall surface 153 of wall 146 as seen best in FIGS. 16 and 13. As shown in FIGS. 14 and 15, a plurality of tabs 152 extend from an outer surface 154 of the wall 146. The tabs 152 have a finger-like shape and are configured to flex relative to the wall 146 so that they may be moved toward the wall 146 when the vial holder 130 is inserted into the frame 12, as will be discussed in greater detail below. As shown in FIG. 15A, distal ends 156 of the tabs 152 extend past the wall 146 and are configured to engage the central side wall 32 of the frame 12 that includes the opening 48a. At the same time, the flange 149 engages the opposite central side wall 32. Because the distance between the flange 149 and the distal ends 156 of the tabs 152 (when the tabs 152 are in their fully extended position) is slightly less than the distance between the central side walls 32, the first portion 131 of the vial holder 130 becomes essentially "wedged" between the central side walls 32 of the frame 12 once the vial holder 130 has been inserted into its proper place in the frame 12 through the larger opening 48a.

Figures 12, 13:
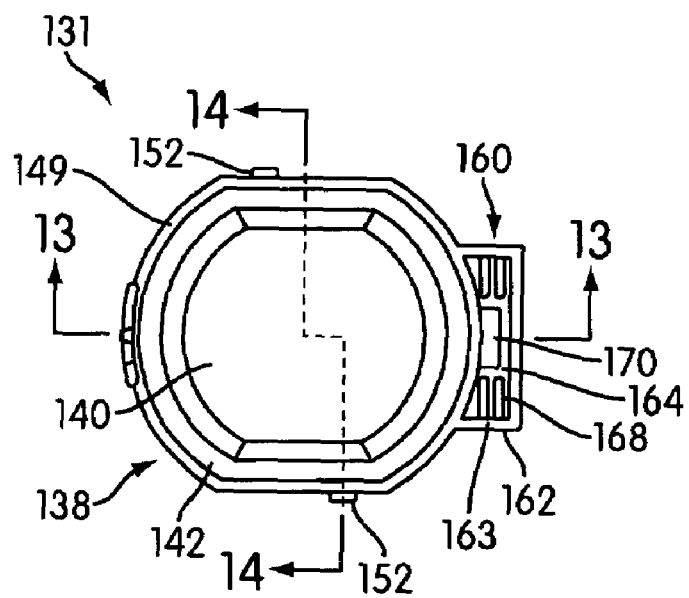
FIG. 12 is a bottom view of a first portion of a vial holder of a vertical indicating level vial holder assembly according to an embodiment of the invention.
FIG. 13 is a cross-sectional view of the first portion taken along line 13-13 in FIG. 12.
Figure 16:
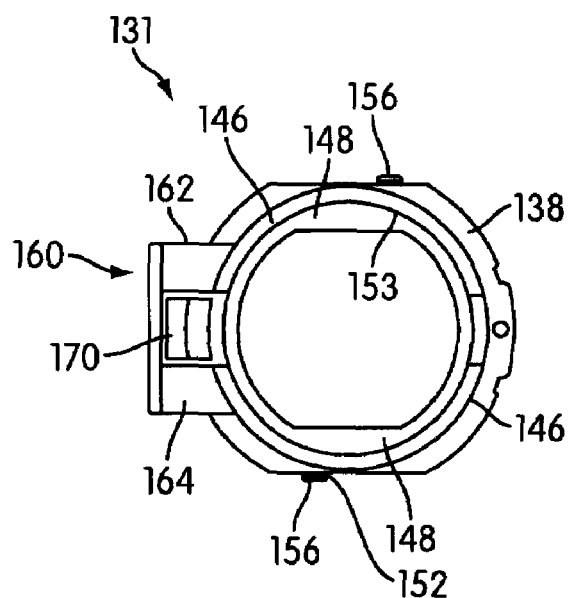
FIG. 16 is a cross-sectional view of the first portion taken along line 16-16 in FIG. 15.

As shown in FIGS. 12, 13, and 16, the first portion 131 of the vial holder 130 also includes an adhesive receiving structure 160 that includes a side wall 162 having a frame engaging surface 163 and an upper wall 164. As shown in FIGS. 15 and 15A, the side wall 162 may also include a notch 165 that is configured to engage the inwardly defined rib 34 of the central side wall 32 of the frame 12. The notch 165 further enhances the snug fit between the first portion 131 of the vial holder 130 and the frame 12. As shown in FIG. 13, a cavity 166 is defined by the upper wall 164, side wall 162, and central side wall 32 of the frame 12 when the frame engaging surface 163 engages the central side wall 32 of the frame 12. The upper wall 164 includes a plurality of ribs 168 that define a roughened surface, thereby provided an increased surface area for the adhesive that is dispensed into the cavity to bond to. The upper wall 164 also includes an opening 170 that is configured to receive an adhesive applicator. As shown in FIG. 13, the upper wall 164 may include a slightly sloped surface 172 to facilitate the insertion of the applicator to ensure that the adhesive is delivered to the cavity 166.

Figure 17:
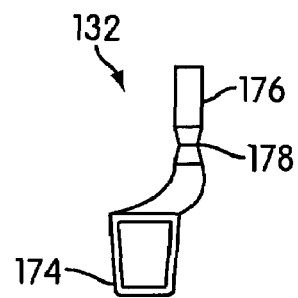
FIG. 17 is a side view of a plug of the vertical indicating level vial holder assembly.

Once the first portion 131 of the vial holder 130 has been inserted into the frame 12 and properly positioned, a predetermined amount of adhesive that substantially fills the cavity 166 may be dispensed into the cavity by the applicator, and contained within the cavity 166 by the adhesive receiving structure 160. This ensures that no adhesive is wasted. The adhesive may be any suitable adhesive for attaching plastic to metal, such as an epoxy resin. The plug 132 or cover, as shown in FIG. 17, is configured to be received by the opening 170 at one end portion 174 thereof, and cover the opening 170 so that the adhesive cannot flow out of the cavity 166. If enough adhesive has been applied, the end portion 174 of the plug 132 also contacts the adhesive such that it becomes firmly bonded to the first portion 131 of the vial holder 130 once the adhesive cures. A stem 176 extends from the end portion 174 has a reduced thickness at a middle section 178 thereof that is configured to allow the stem 176 to be broken once the plug 132 has been secured to the first portion 131 of the vial holder 130. The broken off portion of the stem may then be discarded. A small amount of adhesive may also be provided between the first portion 131 and the frame 12 at a location that is about 180° from the adhesive receiving structure 160, thereby provided a second bond on an opposite side of the first portion 131 of the.

Figure 18:
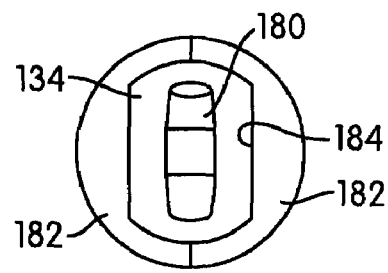
FIG. 18 is a view of a vertical indicating level vial of the vertical indicating level vial holder assembly.

The vertical level indicating vial 134, shown in FIG. 18 may be molded from clear acrylic into a block having a generally tubular or a barrel-like cavity 180 defined therein. A pair of mounts 182 may also be used to substantially surround the edge of the vial 134 and provide an interface between the vial 134 and the first portion 131 of the vial holder 130. The mounts 182 may be configured to define a window 184 through which the cavity 180 may be viewed. The mounts 182 may be attached to the vial 134 with any type of suitable quick-setting adhesive. Likewise, the mounts 182 may be attached to the vial holder with any type of suitable quick-setting adhesive once the vial 134 has been properly positioned in the first portion 131 of the vial holder 130 during assembly, as discussed in further detail below. Of course, other types of level indicating vials that are capable of providing accurate vertical level indications may be used. The illustrated embodiment is not intended to be limiting in any way.

Figure 19:
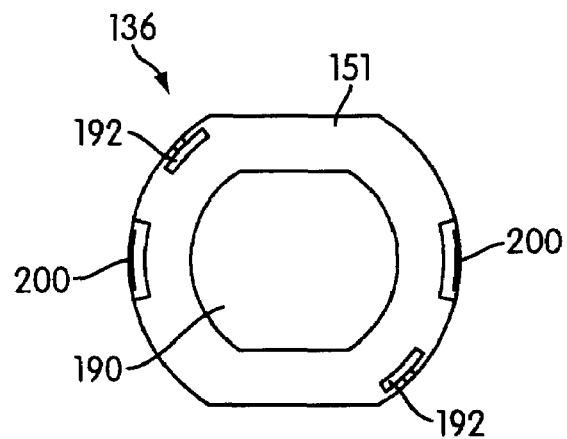
FIG. 19 is bottom view of a second portion of the vial holder of the vertical indicating level vial holder assembly.
Figure 20:
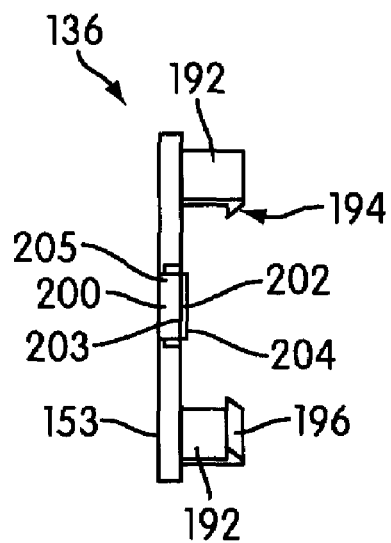
FIG. 20 is a side view of the second portion of the vial holder of FIG. 19.

FIGS. 19 and 20 illustrate an embodiment of a second portion 136 of the vial holder 130. The second portion 136 is configured to have a window 151 that is substantially the same shape as the window 138 of the first portion 131, so that once the level 10 is assembled, the appearance of the installed vertical level indicating vial assembly 18 is the same from opposite sides of the level 10. Just as the opening 48a is larger than the opening 48b, the window 151 is larger than the window 138 that is received in the opening 48b. The window 151 defines an opening 190 that is configured to allow the vial 134 to be seen from a wide range of vantage points. As with the first portion 131, the outer surface 153 of window 151 is to be mounted generally flush (or co-planar) with a major portion of the exterior surface 33 of side wall 32 (see FIG. 23), not taking into account ribs 35, for example.

As shown in FIG. 19, the second portion 136 also includes a pair of tabs 192 that are configured to engage a pair of corresponding recesses 194 in the wall 146 of the first portion 131, one of which is shown in FIG. 15. As shown in FIG. 20, each tab 192 includes a hook 196 at a distal end thereof. The hook 196 has a sloped surface 198 that is configured to engage the exterior surface of wall 146 of the first portion 131 and allow the tab 192 to first flex outward, then "snap" inward once the hook 196 reaches the recess 194, thereby providing a "snap fit" of the second portion 136 to the first portion 131. By providing a pair of tabs 192 on the second portion 136 and corresponding pair of recesses 194 on the first portion 131, the second portion 136 may be securely attached to the first portion 131 without the use of an adhesive or other type of fastener. Of course, if desired, an adhesive may optionally be applied between the second portion 136 and the first portion 131 for further reinforcement.

The second portion 136 also includes a pair of tabs 200 that each includes a hook 202 at a distal end thereof. Each hook 202 includes a sloped surface 204, similar to the sloped surface 198 described above, and is configured to engage the central side wall 32 of the frame 12, thereby providing a "snap fit" of the second portion 136 to the central side wall 32. Such a snap fit provides an attachment of the second portion 136 to the frame 12 without the use of an adhesive or other fastener. Of course, if desired, an adhesive may optionally be applied between the second portion 136 and the frame 12 for further reinforcement.

Figure 20A:
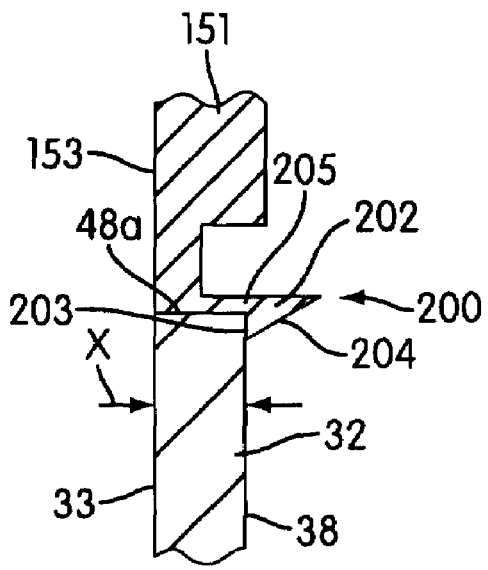
FIG. 20A is a partial enlarged cross-sectional view of the second vial holder of FIG. 20 as it engages the frame of FIG. 4.

As shown in detail in FIG. 20A, in the installed position, a surface 203 under the hook 202 engages the inner surface 38 of the frame wall 32, adjacent the edge defining larger opening 48a. The edge defining larger opening 48a rides along the sloped surface 204 until the hook 202 snaps into the opening 48b, so that surface 203 rests against the interior surface of the wall 32. A leg portion 205 of tab 200 has a length X that extends from the front outer surface 153 of the window 151 to the surface 203. The length X is the same as the wall thickness of wall 32, so that the outer surface 153 is generally flush (or co-planar) with the exterior surface of the wall 32.

Figure 21:
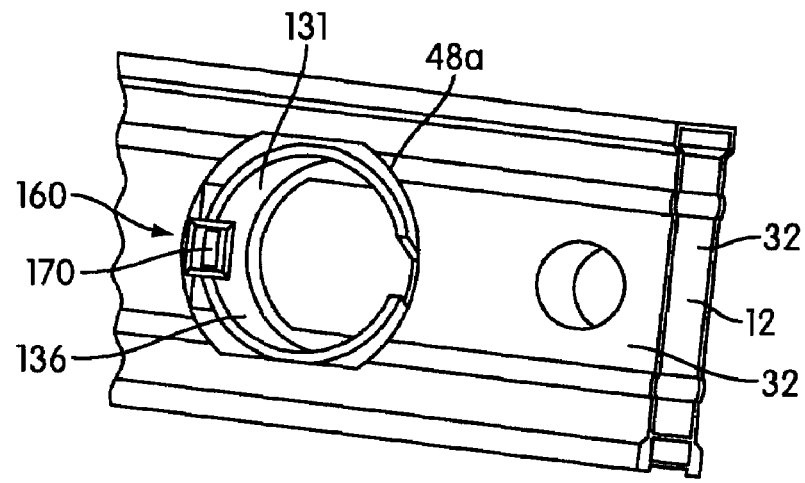
FIG. 21 is a perspective view of one end of the frame of the level with the first portion of the vial holder of the vertical indicating level vial assembly inserted therein.
Figure 22:
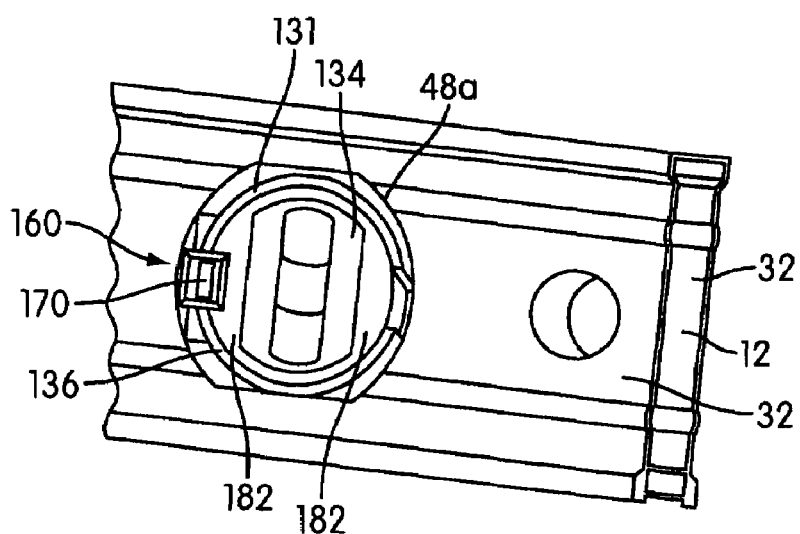
FIG. 22 is a perspective view of the end of the frame of FIG. 21 with the vertical indicating level vial inserted in the first portion of the vial holder.
Figure 23:
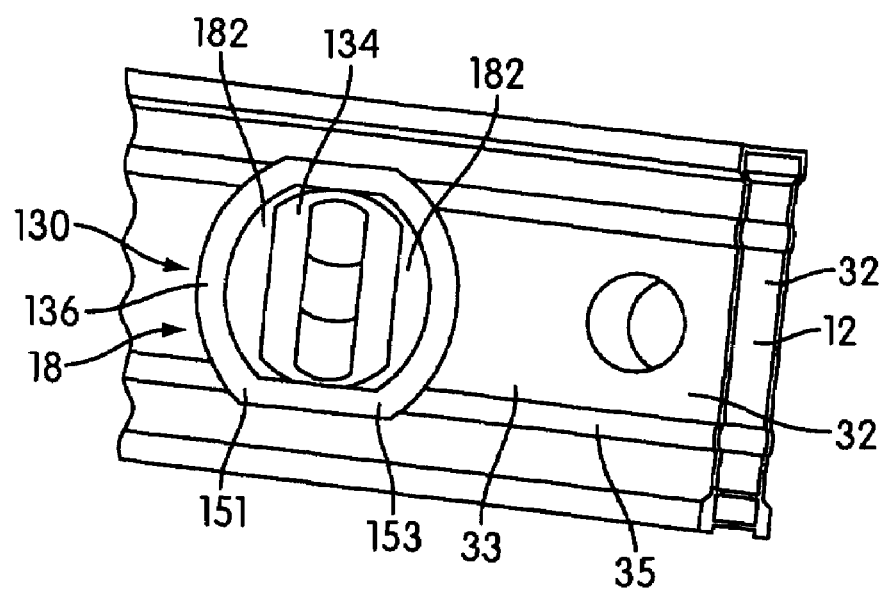
FIG. 23 is a perspective view of the end of the frame of FIG. 21 with the second portion of the vial holder connected to the first portion of the vial holder and the frame.

FIGS. 21-23 illustrate the assembly of pieces of the vertical indicating level vial assembly 18 with the frame 12. As shown in FIG. 21, the first portion 131 is inserted into the frame 12 by being passed through the larger opening 48a in the central side wall 32. Preferably, the adhesive receiving structure 160 is inserted through the larger opening 48a first, then the first portion 131 is slightly rotated so that the window 138 clears the opening 48a and the tabs 152 on the first portion 131 engage the opening 48a. The first portion 131 may then be rotated so that the window 138 is aligned with the smaller opening 48b in the opposite central side wall 32, and then pressed into place. The tabs 152 clear the central side wall 32 and the distal ends 156 of the tabs 152 engage the interior surface 38 of the central side wall 32 to essentially "wedge" the first portion 131 in between the central side walls 32. The first portion 131 is now properly positioned. The predetermined amount of adhesive may be applied to the cavity 166 with an applicator, and the plug 132 may be inserted into the opening 170 so as to seal the cavity 166 closed. The handle 176 of the plug 132 may then be broken off at the reduced thickness portion 178. An additional application of the adhesive may then be applied to the first portion 131 at an additional point that is 180° from the cavity 166 for additional reinforcement, if desired.

As shown in FIG. 22, the vertical level indicating vial 134, having already been attached to the mounts 182, may then be inserted through the opening 48a and into the first portion 131. After the vertical level indicating vial 134 has been received by the first portion 131, the vertical level indicating vial 134 may be accurately positioned relative to the reference surface so that vertical level indicating vial 134 provides an accurate indication of the orientation of the level 10. Once the vertical level indicating vial 134 is in the correct position, an adhesive may be applied between the mounts 182 and the wall 146 of the first portion 131 to thereby fix the position of the vertical level indicating vial 134. As shown in FIG. 23, the second portion 136 may then be inserted into the opening 48a and snap fit to the first portion 131 via the tabs 192, and also snap fit to the frame 12 via the tabs 200. The vertical level indicating vial assembly 18 is now securely attached to the frame 12, with the vertical level indicating vial 134 accurately positioned.

The illustrated embodiment provides for an improved method of assembly, as all of the parts of the vertical level indicating vial assembly 18 are inserted through the same side of the frame 12. In addition, by providing a cavity 166 in which to deposit the adhesive, a predefined, consistent amount of adhesive may be used, thereby ensuring that there is enough adhesive present to ensure a proper bond between the vertical level indicating vial assembly 18 and the frame 12, and also ensuring that no adhesive is being wasted, which may reduce the cost to manufacture the level 10.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A level comprising:
a frame that defines at least one substantially flat exterior surface configured to be placed against a reference surface, the frame defining a plurality of interior surfaces;
a vial for indicating an orientation of the reference surface; and
a vial holder for holding the vial in an orientation relative to the flat exterior surface of the frame, the vial holder having a first wall that engages one of the interior surfaces and a second wall that is spaced from and generally faces the one of the interior surfaces, the first wall and the second wall configured to cooperate with the one of the interior surfaces of the frame to define a cavity when the first wall contacts said interior surface; and
an adhesive disposed in the cavity to secure the vial holder to the frame, the first wall defining a boundary for the adhesive, and adhesive within the cavity contacting both the one of the interior surfaces and the second wall that is spaced from and generally faces the one of the interior surfaces.

2. A level according to claim 1, wherein the second wall of the vial holder includes a roughened surface that contacts the adhesive.

3. A level according to claim 1, wherein the adhesive is substantially contained within said cavity.

4. A level according to claim 1, wherein the vial holder comprises an opening for providing access to the cavity when the vial holder contacts said interior surface, the opening being configured to receive the adhesive.

5. A level according to claim 4, wherein the vial holder further comprises a cover to cover the opening after the cavity has received the adhesive.

6. A level according to claim 1, wherein the vial holder comprises at least one locater for locating the vial holder relative to the frame in at least one direction.

7. A level according to claim 6, wherein the locator locates the vial holder relative to the frame in two directions.

8. A level according to claim 1, wherein the vial holder comprises a guide for mounting the vial to the vial holder.

9. A level according to claim 8, further comprising a vial mount for receiving the vial and mounting the vial to the vial holder, the vial mount comprising a second guide, wherein the guide of the vial holder is configured to align with the second guide.

10. A level according to claim , wherein the plurality of interior surfaces include a bottom interior surface, a top interior surface, and a pair of side interior surfaces that each connect the bottom interior surface to the top interior surface such that an interior space is defined by the plurality of interior surfaces.

11. A level according to claim 10, wherein at least one of the side interior surfaces comprises a rib, and wherein the vial holder comprises at least one tab for engaging the rib so as to locate the vial holder relative to the body portion in at least one direction.

12. A level according to claim 11, wherein each of the side interior surfaces comprises a rib, and wherein the vial holder comprises a pair of tabs on opposite sides of the vial holder, each tab being configured to engage one of the ribs.

13. A level according to claim 10, wherein at least one of the side interior surfaces comprises a rib, and wherein a portion of the vial holder is configured to engage the rib.

14. A level according to claim 10, wherein each of the side interior surfaces comprises an opening, the opening in one of the side interior surfaces being larger than the opening in the other side interior surface.

15. A level according to claim 14, wherein the larger opening is large enough for the vial holder to pass through.

16. A level according to claim 15, wherein the cavity is formed between the vial holder and the side interior surface that comprises the smaller opening.

17. A level according to claim 16, wherein a portion of the vial holder extends through the smaller opening.

18. A level according to claim 17, wherein the vial holder comprises a tab that engages the side interior surface that includes the larger opening to position the vial holder relative to the body portion in at least one direction.

19. A level according to claim 18, further comprising a window for covering an exposed edge of the vial holder, a portion of the window extending through the larger opening and engaging the vial holder such that the vial is located between the vial holder and the window.

20. A level according to claim 19, wherein the window comprises at least one tab configured to engage a corresponding recess in the vial holder.

21. A level according to claim 20, wherein exterior surfaces of the vial holder and the window are substantially flush with corresponding exterior surfaces of the frame.

22. A method for assembling a level, the level comprising a frame, a vial holder, and a vial, the method comprising:
   inserting the vial holder into the frame so that a first wall of the vial holder engages an interior surface of the frame and a second wall of the vial holder is spaced from and generally faces the interior surface of the frame to define a cavity;
   providing a predetermined amount of adhesive to the cavity formed between the vial holder and the frame to adhere the vial holder to the frame; and
   securing the vial to the vial holder.

23. A method according to claim 22, further comprising sealing the cavity with a cover prior to said securing the vial to the vial holder.

24. A method according to claim 22, wherein said securing the vial to the vial holder comprises providing an adhesive between the vial and the vial holder.

25. A method according to claim 24, wherein the adhesive is the same type of adhesive used in the predetermined amount.

26. A method according to claim 24, wherein the adhesive is different from the adhesive used in the predetermined amount.

27. A method according to claim 22, further comprising placing a window over the vial and securing the window to the vial holder.

28. A method according to claim 22, wherein the frame comprises a bottom interior surface, a top interior surface, and a pair of side interior surfaces that connect the bottom interior surface to the top interior surface, each of the side interior surfaces comprising an opening, with one of the openings being larger than the other opening, and wherein said inserting the vial holder into the body portion comprises passing the vial holder through the larger opening and locating the vial holder at the other opening.

29. A method according to claim 28, wherein said securing the vial to the vial holder comprises passing the vial through the larger opening, inserting the vial into the vial holder, and providing an adhesive between the vial and the vial holder.

30. A method according to claim 29, further comprising placing a window over the vial and securing the window to the vial holder.

* * * * *